US008190191B2

(12) United States Patent
Livet et al.

(10) Patent No.: US 8,190,191 B2
(45) Date of Patent: May 29, 2012

(54) MOBILITY MIDDLEWARE ARCHITECTURE FOR MULTIPLE RADIO ACCESS TECHNOLOGY APPARATUS

(75) Inventors: Catherine M. Livet, Montreal (CA); Debashish Purkayastha, Pottstown, PA (US); Shamim Akbar Rahman, Montreal (CA); Guang Lu, Dollard-des-Ormeaux (CA); Alan Gerald Carlton, Mineola, NY (US); Narayan Parappil Menon, Syosset, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 783 days.

(21) Appl. No.: 11/609,525

(22) Filed: Dec. 12, 2006

(65) Prior Publication Data

US 2007/0173283 A1    Jul. 26, 2007

Related U.S. Application Data

(60) Provisional application No. 60/751,332, filed on Dec. 16, 2005, provisional application No. 60/792,777, filed on Apr. 18, 2006, provisional application No. 60/862,326, filed on Oct. 20, 2006.

(51) Int. Cl.
*H04M 1/00* (2006.01)
*H04W 36/00* (2009.01)
*H04W 4/00* (2009.01)
*H04M 1/66* (2006.01)
*H04M 1/68* (2006.01)
*H04M 3/16* (2006.01)
*H04M 9/00* (2006.01)

(52) U.S. Cl. ............... 455/550.1; 455/436; 455/437; 455/438; 455/439; 455/410; 455/411; 455/552.1; 370/331; 379/433.09

(58) Field of Classification Search ............... 455/550.1, 455/410–411, 436–439, 552.1; 370/331; 379/433.09
See application file for complete search history.

(56) References Cited

U.S. PATENT DOCUMENTS
6,628,652 B1 *  9/2003  Chrin et al. ................ 370/386
(Continued)

FOREIGN PATENT DOCUMENTS
EP          1 117 265        7/2001
(Continued)

OTHER PUBLICATIONS

3GPP, 3GPP TS 25.301 V5.1.0 (Jun. 2002), 3GPP, Release 5, 42 Pages.*

(Continued)

*Primary Examiner* — Nick Corsaro
*Assistant Examiner* — Munsoon Choo
(74) *Attorney, Agent, or Firm* — Volpe and Koenig, P.C.

(57) ABSTRACT

A multiple radio access technology (RAT) apparatus with mobility middleware provides a user with access to various RAT networks, such as a frequency division duplex (FDD) network and a wireless local area network (WLAN). In one embodiment, the apparatus is a dual mode FDD/WLAN converged wireless communication handset which includes a terminal equipment (TE) module having mobility middleware, an applications and protocols processor and a terminal interface (TI). The dual mode FDD/WLAN converged wireless communication handset further includes a user services identity module (USIM), a mobile termination (MT) module and a protocol stack which interface with the mobility middleware via a plurality of links. In another embodiment, the multi-RAT apparatus is terminal equipment which includes a mobility middleware core module, a mobility middleware communication module, a driver and an insertably removable wireless communication device for providing a multiple radio transport medium to applications running in the terminal equipment.

35 Claims, 9 Drawing Sheets

U.S. PATENT DOCUMENTS

| | | | |
|---|---|---|---|
| 6,987,985 B2 | 1/2006 | Purkayastha et al. | |
| 2004/0260801 A1* | 12/2004 | Li | 709/223 |
| 2005/0249161 A1 | 11/2005 | Carlton | |
| 2005/0281270 A1* | 12/2005 | Kossi et al. | 370/395.5 |
| 2006/0034231 A1* | 2/2006 | Tailor | 370/338 |
| 2006/0123470 A1* | 6/2006 | Chen | 726/5 |
| 2006/0209882 A1* | 9/2006 | Han et al. | 370/465 |
| 2007/0073899 A1* | 3/2007 | Judge et al. | 709/246 |
| 2007/0115899 A1* | 5/2007 | Ovadia et al. | 370/338 |
| 2009/0082007 A1* | 3/2009 | De Benedittis et al. | 455/423 |

FOREIGN PATENT DOCUMENTS

| | | |
|---|---|---|
| JP | 2002-112347 | 4/2002 |

OTHER PUBLICATIONS

Middleware, webopedia computer dictionary, 10 pages.*

3GPP, *3rd Generation Partnership Project; Technical Specification Group Services and System Aspects General Universal Mobile Telecommunications System (UMTS) Architecture (Release 6)*, 3GPP TS 23.101 V6.0.0 (Dec. 2004), (Dec. 2004).

Sood et al., *Seamless Platform Mobility Across Wireless Networks*, Technology@Intel Magazine, (Sep. 2005).

3GPP, *3rd Generation Partnership Project; Technical Specification Group Services and System Aspects General Universal Mobile Telecommunications System (UMTS) Architecture (Release 6)*, 3GPP TS 23.101 V6.0.0 (Dec. 2004).

Bellavista et al., *Mobile Agent Middleware for Mobile Computing*, IEEE Computer Society, XP-002438120, pp. 73-81, (Mar. 2001).

Carlton et al., *Media Independent Handover Functions and Services Specification*, IEEE 802.21 Media Independent Handover, XP-002426057, (Jan. 9, 2005).

Carlton et al., *Media Independent Handover Functions and Services Specification*, IEEE 802.21 MIHO, XP-002426102, (Jul. 11, 2005).

Rolf Sigle (Alcatel), *MRA Architecture, Mobile and Wireless Systems Beyond 3G*, Sixth Framework Programme, XP-002337899, (Feb. 17, 2005).

Sood et al., *Seamless Platform Mobility Across Wireless Networks*, Technology@ Intel Magazine, (Sep. 2005).

Sreemanthula et al., *A Problem Statement for Event Services and Command Services for Media Independent Handovers*, IETF Standard-Working-Draft, Internet Engineering Task Force, (Oct. 24, 2005).

Vivek Gupta, *Requirements and Suggested Amendments for IEEE 802.11*, IEEE 802.21 Media Independent Handover Services, XP-002438121, (Sep. 2005).

* cited by examiner

MOBILITY MIDDLEWARE ARCHITECTURE FOR MULTIPLE RADIO ACCESS TECHNOLOGY APPARATUS

CROSS REFERENCE TO RELATED APPLICATIONS

This application claims the benefit of U.S. Provisional Application No. 60/751,332 filed Dec. 16, 2005, U.S. Provisional Application No. 60/792,777 filed Apr. 18, 2006 and U.S. Provisional Application No. 60/862,326 filed Oct. 20, 2006, which are incorporated by reference as if fully set forth.

FIELD OF INVENTION

The present invention is related to terminal equipment architecture. More particularly, the present invention is related to mobility middleware which manages multiple radio access technologies (RATs) within terminal equipment.

BACKGROUND

Convergence is a term used for an emerging trend in the telecommunications and Internet industry to incorporate the functionality of many different types of devices into a single unit. It includes convergence of networks, terminal devices, and services. In the context of wireless communications, a converged device typically has the capability to support multiple access technologies to communicate with different networks, such as radio access technology, (e.g., IEEE 802.11, third generation partnership project (3GPP), code division multiple access (CDMA), Bluetooth®, or the like), or wired access technology, (e.g., Ethernet IEEE 802.3).

One of the most challenging problems associated with a converged device is maintaining mobility across heterogeneous networks. Some standards groups address various parts of the mobility issues, such as IEEE 802.21 which provides link layer intelligence to assist mobility, or Internet Engineering Task Force (IETF) mobile Internet protocol (IP) for layer 3 (L3) mobility.

Currently, the current high-end market dominated by personal data assistant (PDA) and smartphone platforms predominantly uses dual-processor hardware architectures, (one for modem, plus one for applications).

In a 3GPP handset, such as a dual mode universal mobile telecommunications system (UMTS) frequency division duplex (FDD)/wireless local area network (WLAN) handset, a mobile termination (MT) module is used to perform radio transmission and related functions, a terminal equipment (TE) module contains end-to-end applications, and a user services identity module (USIM) contains data and procedures which unambiguously and securely identify the handset.

Although present standards, such as IETF mobile IP or IEEE 802.21, specify messaging to enable mobility, they do not provide any implementation solution. Moreover, some coordination is required between these mobility entities. However, this coordination has not been addressed by any standard groups.

Furthermore, it would be advantageous to provide a mobility middleware architecture where an application processor and the RAT networks are not in the same platform.

SUMMARY

The present invention is related to a multiple RAT apparatus with mobility middleware which provides a user with access to various RAT networks, such as an FDD network and a WLAN. In one embodiment, the apparatus is a dual mode FDD/WLAN converged wireless communication handset which includes a TE module having mobility middleware, an applications and protocols processor and a terminal interface (TI). The dual mode FDD/WLAN converged wireless communication handset further includes a USIM, an MT module and a protocol stack which interface with the mobility middleware via a plurality of links. In another embodiment, the multi-radio access technology apparatus is terminal equipment which includes a mobility middleware core module, a mobility middleware communication module, a driver and an insertably removable wireless communication device for providing a multiple radio transport medium to applications running in the terminal equipment.

The insertably removable wireless communication device may be an FDD/wireless broadband (WiMAX) personal computer (PC) card. The mobility middleware comprises a set of functions including network detection, network selection, inter-network handover, parallel attach, measurement, multi-access quality of service (QoS), security and power control.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, a laptop or any other type of user device capable of operating in a wireless environment.

The present invention introduces a cross-layer function, called mobility middleware, which refers to a set of functions that enable seamless mobility within heterogeneous networks and support for multiple services. These functions may include network detection, network selection, inter-network handover, parallel attach, (when the device is connected simultaneously to multiple access technologies), measurement, multi-access QoS, security and power control.

The mobility middleware does not sit in any specific protocol layer. The mobility middleware provides interaction across layers. The interactions with applications and access layers are done through an application program interface (API).

Figure 1:
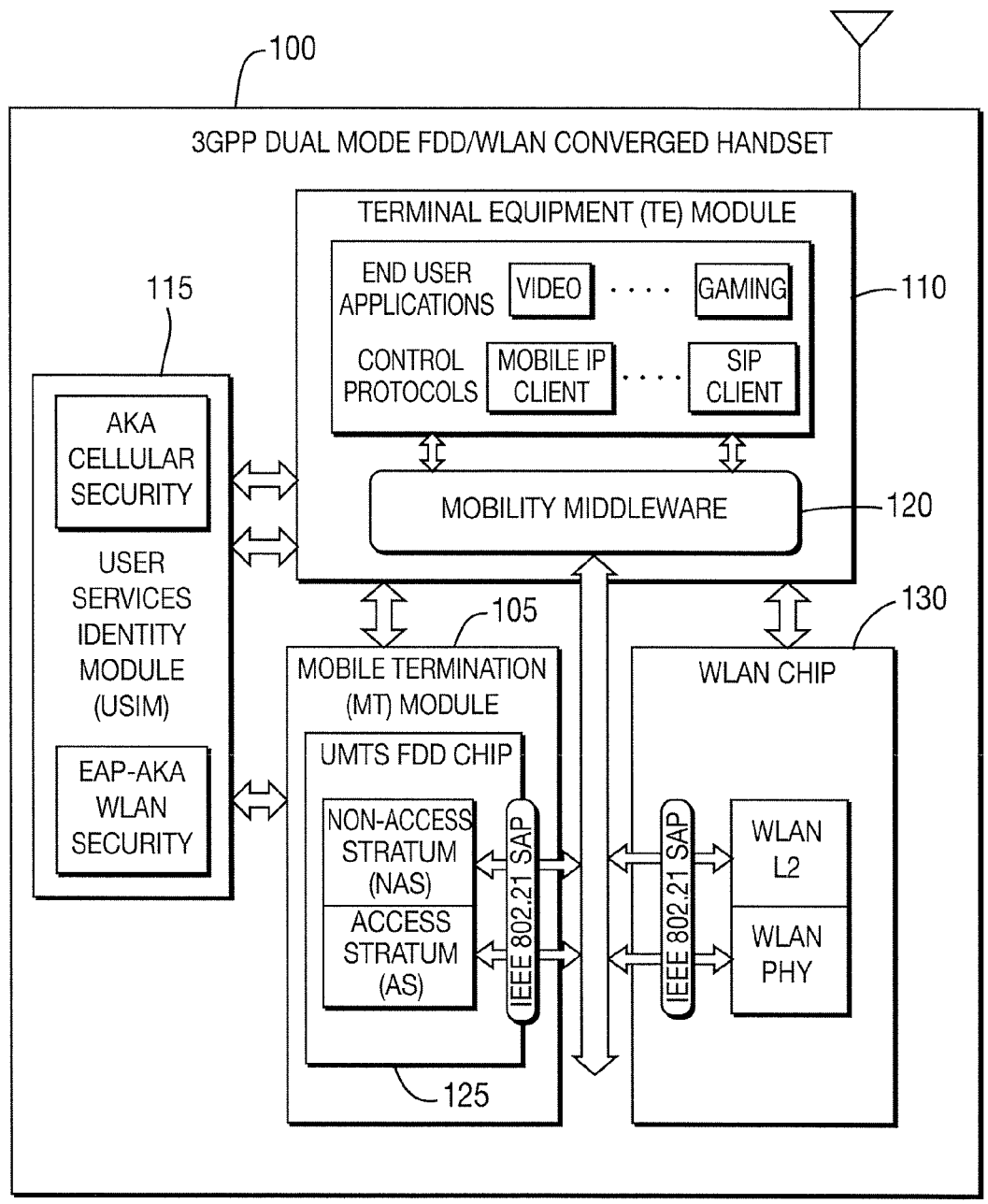
FIG. 1 shows a high-level view of a 3GPP dual mode FDD/WLAN converged wireless communication handset including a mobility middleware function which is configured in accordance with the present invention.

FIG. 1 shows a high-level view of a 3GPP dual mode FDD/WLAN converged wireless communication handset 100 of a cell phone including a mobility middleware function which is configured in accordance with the present invention. The 3GPP dual mode FDD/WLAN converged wireless communication handset 100 includes a mobile termination (MT) module 105, a terminal equipment (TE) module 110 and a user services identity module (USIM) 115. TE module 110 includes mobility middleware 120. Depending on the implementation, the MT module 105, the TE module 110 and the USIM 115 may be incorporated on the same or separate chips or processors. The MT module 105 may include a UMTS FDD chip 125. Furthermore, the 3GPP dual mode FDD/WLAN converged wireless communication handset 100 may include a WLAN chip 130. Although only UMTS FDD, (i.e., cellular), and WLAN are represented in FIG. 1 by chips 125 and 130, respectively, as an example of realization, the 3GPP dual mode FDD/WLAN converged wireless communication handset 100 may support many other types of access technologies, (e.g., IEEE 802.15, digital video broadcasting - handheld (DVB-H) and the like). The mobility middleware 120 integrates applications and multiple access networks.

The mobility middleware 120 enables end user applications to run seamlessly as the middleware coordinates handovers across various technologies. For example, a user of the 3GPP dual mode FDD/WLAN converged wireless communication handset 100 will not observe any disruption of a streaming video during a handover between a cellular network and a WLAN. The mobility middleware 120 coordinates and controls mobility. For example, the mobility middleware 120 may determine that the WLAN radio interface is degrading and initiate a cellular stack in preparation for a handover. The mobility middleware 120 may then trigger mobile IP to change a network path.

Figure 2:
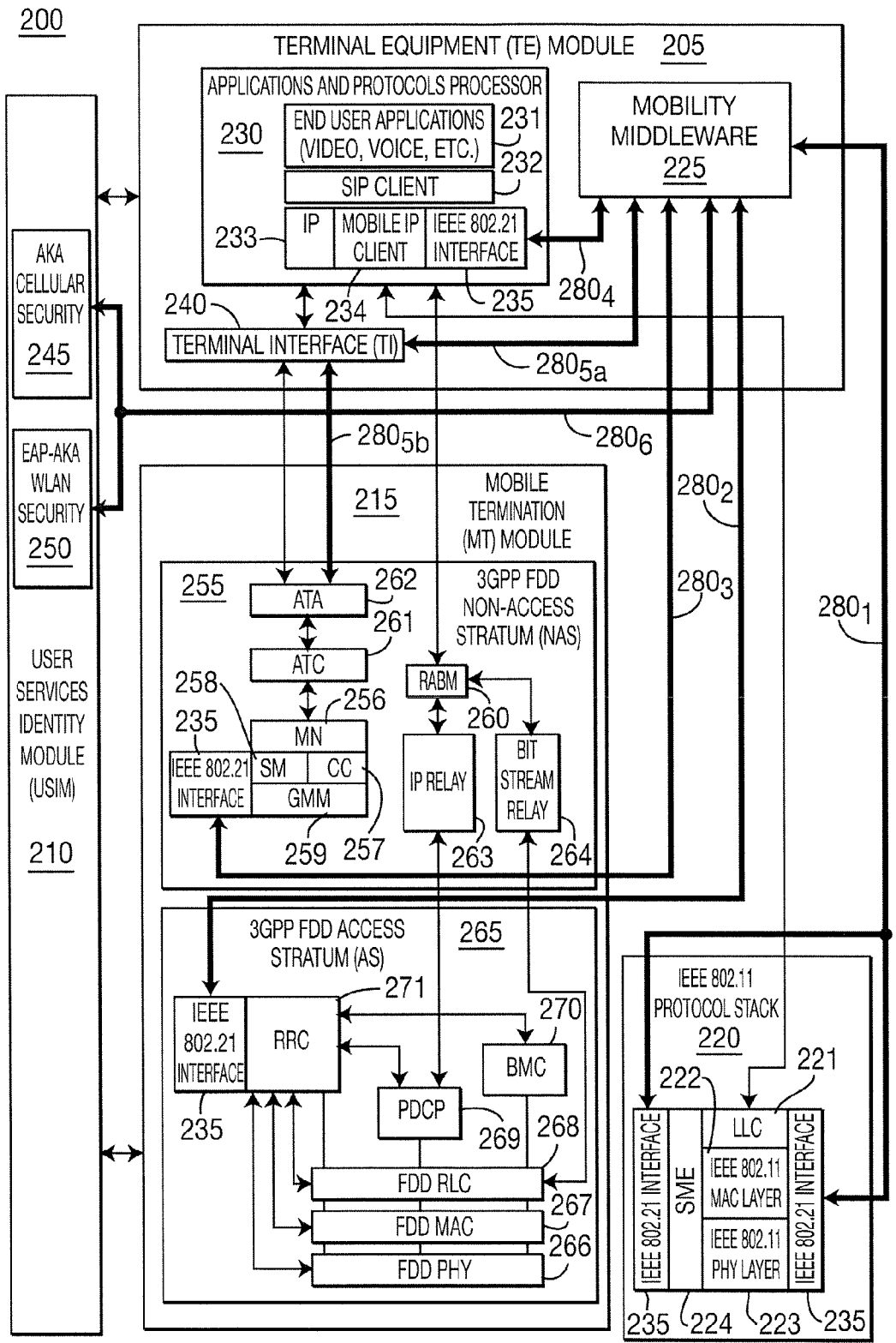
FIG. 2 shows a more detailed view of the 3GPP dual mode FDD/WLAN converged wireless communication handset of FIG. 1.

FIG. 2 shows the architecture of a 3GPP dual mode FDD/WLAN converged wireless communication handset 200 which is configured in accordance with the present invention. The handset 200 includes a TE module 205, a USIM 210, an MT module 215 and an IEEE 802.11 protocol stack 220.

The TE module 205 includes mobility middleware 225, an applications and protocols processor 230 and a terminal interface (TI) 240. The TE module 205, the USIM 210, the MT module 215 and the IEEE 802.11 protocol stack 220 may be incorporated on the same or separate chips or processors, as desired. The applications and protocols processor 230 runs end user applications 231, which are the applications the user ultimately uses. The end user applications 231 may include voice over IP (VoIP), video, and the like. The applications and protocols processor 230 further includes a session initiation protocol (SIP) client 232, an IP suite 233, a mobile IP client 234 and an IEEE 802.21 interface 235 which interfaces with the mobility middleware 225 via link 280$_4$.

As defined in 3GPP standards, the USIM 210 includes an authentication and key agreement (AKA) cellular security module 245 and an extensible authentication protocol (EAP) AKA WLAN security module 250. The security modules 245 and 250 exchange relevant security information with the mobility middleware 225 via the link 280$_6$.

The MT module 215 includes a 3GPP FDD non-access stratum (NAS) 255 and a 3GPP FDD access stratum (AS) 265. The NAS 255 includes a 3GPP functions mobile network (MN) 256, call control (CC) 257, a session manager (SM) 258, a general packet radio service (GPRS) mobility manager (GMM) 259 and a radio access bearer manager (RABM) 260. The RABM 260 handles all the types of radio access bearers (RABs). The NAS 255 further includes an attention command set interpreter (ATC) 261, an ATC advanced technology attachment (ATA) 262, an IP relay 263 and a bit stream relay 264. The ATA 262 ensures that ATC commands are exchanged between the TE module 205 and the MT module 215.

The 3GPP FDD AS 265 includes 3GPP L1/L2/L3 functions, such as an FDD physical layer (PHY) 266, an FDD medium access control layer (MAC) 267, an FDD radio link control (RLC) 268, a packet data compression protocol (PDCP) unit 269, a broadcast and multicast control (BMC) unit and a radio resource control (RRC) 271. The IP relay 263 exchanges IP packets/RABs with the PDCP unit 269. The bit stream relay 264 exchanges non-IP based packets/bit stream RABs, (e.g., voice data, video telephony data, and the like), with the FDD RLC 268.

Both of the NAS 255 and the AS 265 include an IEEE 802.21 interface 235 for communicating with the mobility middleware 225 via the links 280$_3$ and 280$_2$, respectively.

The IEEE 802.11 protocol stack 220 includes a logical link control (LLC) layer 221, an IEEE 802.11 MAC layer 122, an IEEE 802.11 PHY layer 123 and a session management entity (SME) 224, all of which interface with the mobility middleware 225 via IEEE 802.21 interfaces 235 and link 280$_1$.

As shown in FIG. 2, the functions of the mobility middleware 225 interact with other various entities within the 3GPP dual mode FDD/WLAN converged wireless communication handset 100 via links 280$_1$-280$_6$. As previously mentioned, IEEE 802.21 interfaces 235 are incorporated in block 230 of the TE module 205, in the 3GPP FDD NAS 255 and the 3GPP FDD AS 265 of the MT module 215, and in the IEEE 802.21 protocol stack 220.

The mobility middleware 225 refers to a set of functions that enable seamless mobility within heterogeneous networks and support multiple services.

One such function is a network detection function, which allows a terminal to identify characteristics of surrounding networks.

Another function is a network selection function which, within many access networks, selects the access network that is most suitable for a subscriber's demand, based on characteristics such as QoS, system operator, user profile, application requirements, and the like.

Yet another function is an inter-network handover function which performs seamless handover from the previous network to the new selected network. The purpose is to provide service continuity to the user. The function interacts with others mobility functions such as Mobile IP, and the like.

Yet another function is a parallel attach function which enables a device to be connected simultaneously to multiple access technologies to satisfy a particular QoS application. For example, a voice call can be processed through a cellular system, while a file transfer is processed through a WLAN. The parallel attach function interacts with the handover management and the IP layer for context transfer.

Yet another function is a measurement function which collects measurements received from various AT networks and provides input the others mobility middleware functions, e.g., network selection, power management and the like.

Yet another function is a multi-access QoS function which insures that the QoS requirements for an application are addressed by the selected network.

Yet another function is a security function which processes the security operations necessary to provide a relevant security over AT and improve the inter-network handover. For example, the security function can pre-authenticate users to reduce handover delay.

Yet another function is a power control function which coordinates power control function functions of each access technology to improve the battery life of the device.

Regarding the mobility middleware 225 interaction with the IEEE 802.11 protocol stack 220 via the link $280_1$, there is current IEEE 802.11 standardization work on the IEEE 802.11 MAC layer 222 and the IEEE 802.11 PHY layer 223 to support IEEE 802.21 primitives for media independent handover (MIH) services, (e.g., information, events and commands). The IEEE 802.21 primitives may be incorporated into existing or new IEEE 802.11 primitives.

The interaction of the mobility middleware 225 with the 3GPP FDD NAS 255 via the link $280_3$ relies on a direct mapping between the IEEE 802.21 primitives, (i.e., information, events, commands), and some NAS, (SM and GMM), primitives which already exist. There is no change required by the SM 258 and the GMM 259 for the mobility middleware 125 to work with the 3GPP FDD NAS 155.

For mobility middleware 225 interaction with 3GPP FDD Access Stratum (AS) 265 via the link $280_2$, mapping exists between the IEEE 802.21 primitives and the primitives of the FDD radio resource control (RRC) 271. There is no change required by the RRC 271 for the mobility middleware 225 to work with the 3GPP FDD AS 265.

The interaction of the mobility middleware 225 with the mobile IP client 234 via the link $280_4$ includes two aspects. One aspect is that IEEE 802.21 can trigger the mobile IP client 234 to speed up handovers. For example, when an IEEE 802.21 "MIH link down" event occurs, the mobility middleware 225 can forward the event trigger a mobile IP client, thus triggering the TI 240 to register with a foreign agent, obtain care of address and send a "binding update". This can reduce delay in the mobile IP handover procedures.

Another aspect is that there is on going IETF mobile IP standardization activity to support transport of IEEE 802.21 messages, (e.g., information, events and commands), between the TI 240 and the network side over IP via the link $280_{5b}$. This method utilizes mobile IP as a "vehicle" to convey IEEE 802.21 messages between the mobile terminal and the network side, thus minimizing the requirement of changes to existing functions on both sides.

The mobility middleware 225 interacts with existing security functions 245 and 250 in the handset 200 via the link $280_6$ to address security issues during handover. When a handover occurs between the UMTS and a WLAN network, a security consistency must be insured. Thus, an input from the UMTS security part, (e.g., AKA cellular security 245), and the WLAN security part, (e.g., EAP-AKA WLAN security 250), are required by the mobility middleware 225 to ensure this consistency.

Existing AT commands from the ATA 262 may be used to convey commands to/from mobility middleware 225 via the links $280_{5a}$ and $280_{5b}$.

The mobility middleware 225 interacts with applications and service enabling protocols, such as the SIP client 232 via the link $280_4$ and the IEEE 802.21 interface 235. For example, an application can have certain QoS requirements. The mobility middleware 225 will be able to map the QoS requirement to the most suitable network.

The mobility middleware 225 interacts with the IEEE 802.11 protocol stack 220 via the link $280_1$ to facilitate handover procedures. When a handover from FDD to IEEE 802.11 is imminent, due to the 3GPP dual mode FDD/WLAN converged wireless communication handset 200 moving from an area covered by a UMTS FDD network to an area covered by an IEEE 802.11 network. During handover, the mobility middleware 225 may request the IEEE 802.11 protocol stack 220 to initiate the association procedures required for establishing the links 280.

The present invention is directed toward a mobility architecture where the application processor and the RAT networks are not in a same platform. This architecture split between a PC and an insertably removable wireless communication device introduces some complexity and imposes additional requirements on the mobility middleware. A mobility middleware architecture for such devices is introduced, including a specific dual mode FDD/WiMAX device as an example.

Figure 3:
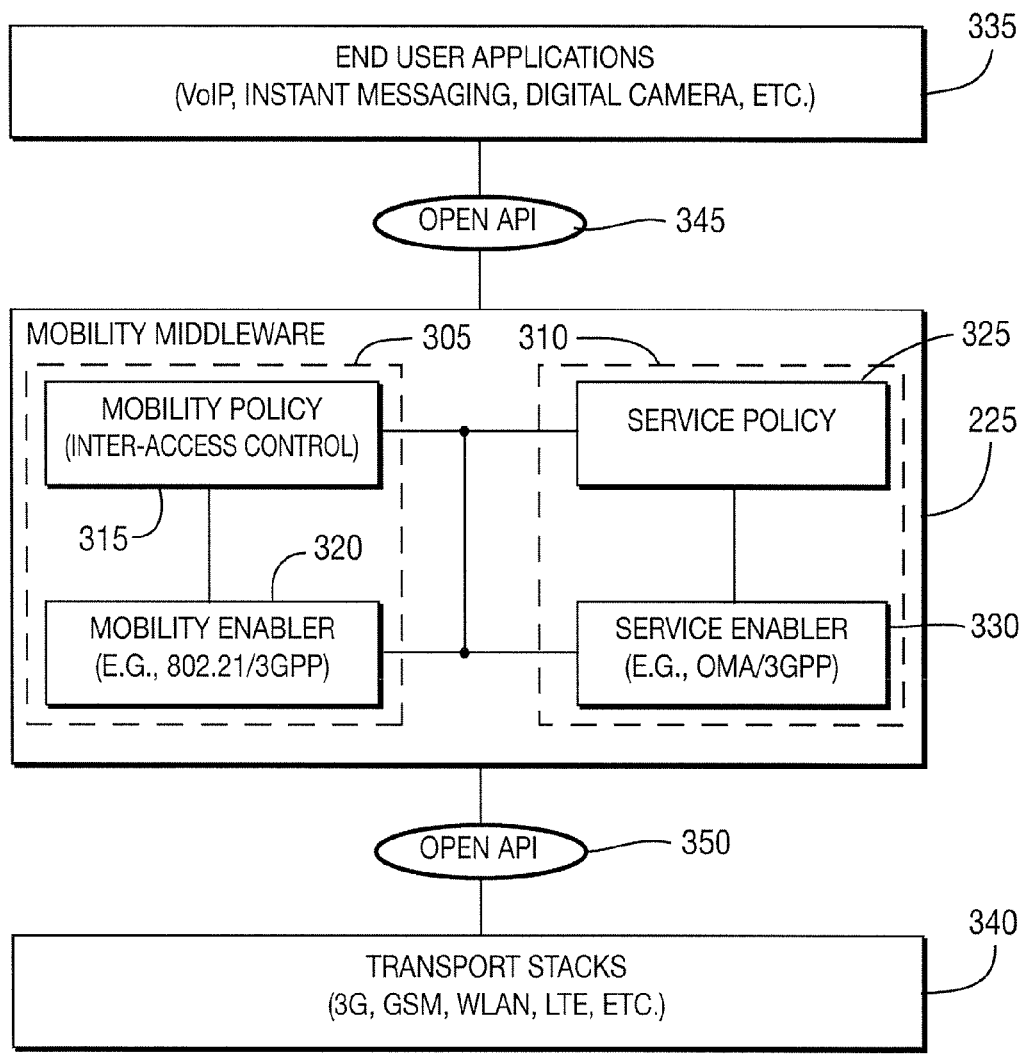
FIG. 3 is an exemplary block diagram of mobility middleware architecture in accordance with one embodiment of the present invention.

FIG. 3 shows the features of the mobility middleware 225 which includes a mobility entity 305 and a service entity 310 containing functionality that enables seamless mobility within heterogeneous networks and support multiple services. The mobility entity 305 includes a relatively independent intelligent decision making part, (i.e., mobility policy 315), and an interface part, (i.e., mobility enabler 320). The service entity 310 also includes a relatively independent intelligent decision making part, (i.e., service policy 325), and an interface part, (i.e., service enabler 330). The service enabler 330 is defined in accordance with either Open Mobile Alliance (OMA) or 3GPP protocols and procedures.

The modular design of the architecture enables the mobility middleware 225 to support a growing number of different end user applications 335, and RATs. For example, if WiMAX is added in a device as a new RAT, an interface to support WiMAX in the mobility enabler 320 is added, while the rest of the mobility middleware remains.

The mobility middleware 225 sits on top of the transport stacks 340, (e.g., 3GPP, global system for mobile communications (GSM), VVLAN, long term evolution (LTE) and the like). There are generally two types of applications that interact with the mobility middleware 225. One type of application is an end user application, (e.g., voice over IP (VoIP), instant messaging, and the like). Another type of application is the high layer protocols, (e.g., Mobile IP or SIP). The applications have coordinated control of the mobility and service middleware functions. For example, the end user applications 335 may use the service and mobility application programming interfaces (APIs) in a coordinated manner through an open API 345.

The mobility middleware 225 does not sit in any specific protocol layer. Instead, the mobility middleware provides interaction across layers, and the interactions with the end user applications 335 and transport stacks 340 are performed through open APIs 345 and 350, respectively.

Figure 4:
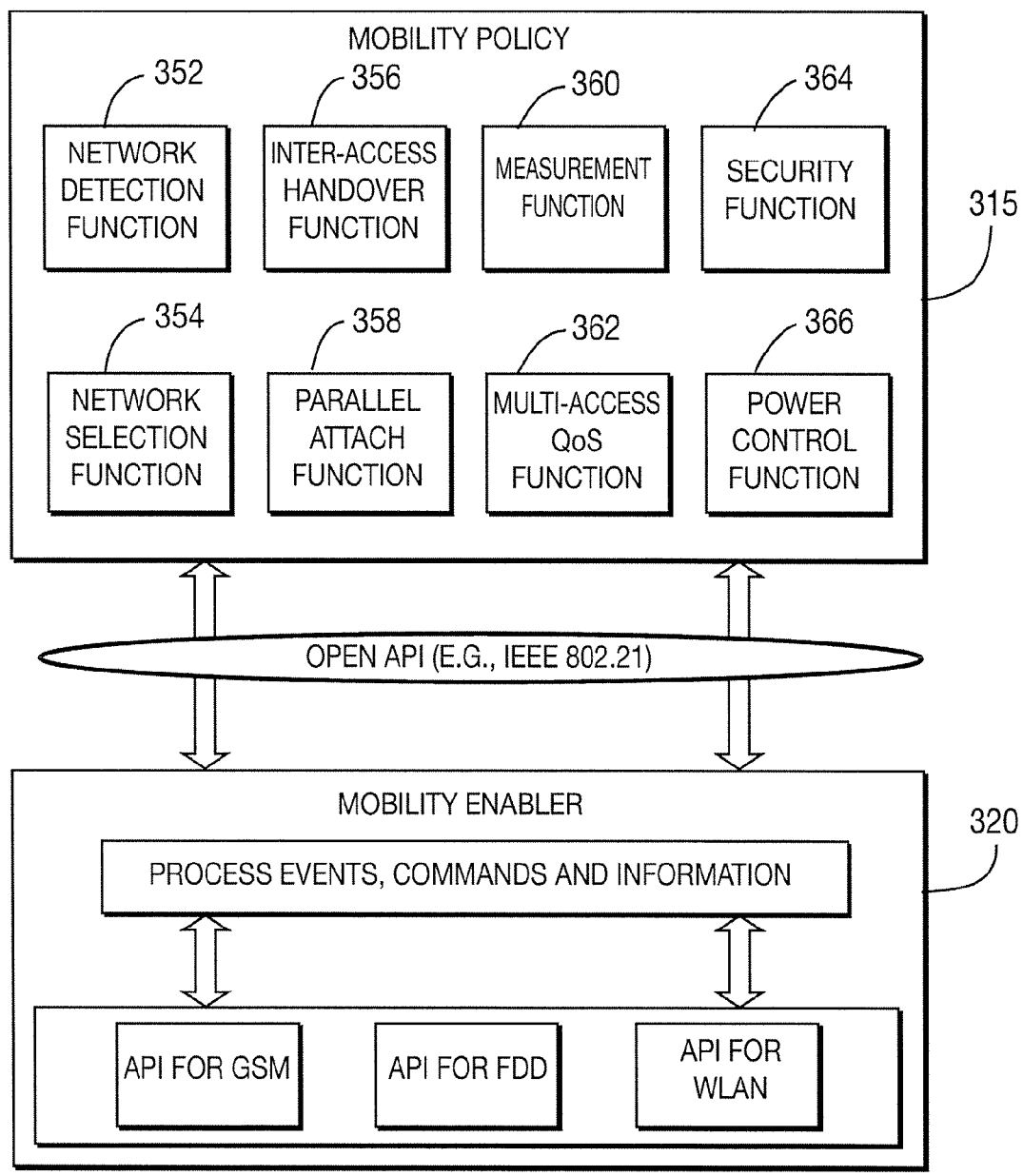
FIGS. 4 and 5 show detailed block diagrams of the mobility middleware architecture of FIG. 3.

FIG. 4 shows a detailed configuration of the mobility policy 315 and the mobility enabler 320 of the mobility entity 305. The mobility policy 315 is an intelligent entity which handles multi-access mobility issues and provides policy and intelligence for heterogeneous mobility and quality of service (QoS) coordination between RATs. It interfaces with access layers via the mobility enabler 320 to monitor and control underlying access technology stacks. The mobility policy 315 uses an open API for end user application control.

The mobility policy 315 contains a set of functions that enable seamless mobility within heterogeneous networks and support multiple services, including: 1) a network detection function 352, which allows a terminal to identify characteristics of surrounding networks; 2) a network selection function 354, which selects one of many access networks which is most suitable for a subscriber's demand, based on characteristics such as QoS, system operator, user profile, application requirements, and the like; 3) an inter-network handover function 356, which performs seamless handover from the previous network to the new selected network, (the purpose is to provide service continuity to the user; the function interacts with others mobility functions such as Mobile IP; 4) a parallel attach function 358, which facilitates the device in connecting simultaneously to multiple RATs to satisfy a QoS application, (e.g., a voice call may be processed through cellular while a file transfer occurs through WLAN). The parallel attach function interacts with the handoff (HO) management and IP layer for context transfer; 5) a measurement function, which collects measurements received from the various RATs and provides input to the others mobility middleware functions, e.g. network selection, power management, and the like; 6) a multi-access QoS function, which ensures that the QoS requirements for an application is addressed by the selected network; 7) a security function 364, which processes the security operations necessary to provide a relevant security over a RAT and improve the inter-network handover, (e.g., the security function can pre-authenticate users to reduce handover delay); and 8) a power control function 366, which coordinates power control functions of each access technology to improve the battery life of the device.

It should be noted that the mobility policy functions do not replace existing mobility functions in each RAT. For example, the inter-network handover deals with issues related to multi-access handover and it interacts with handover functions for each access technology.

The mobility enabler 320 is a "thin" layer of functionalities that interface with different RATs. An open API is used to allow the mobility enabler 320 to collect statistics from the RAT and to transmit commands to the RATs. It also consolidates and normalizes received information from the different RATs, and provides a control/information trigger interface to the mobility policy entity 315, allowing control of the RATs.

The mobility enabler 320 receives and processes measurements from the transport stacks 340 (see FIG. 3), and forwards the processed information to the mobility policy entity 315. It can also send the commands and requests from the Mobility Policy entity 210 to the end user applications 335 (see FIG. 3).

The mobility enabler 320 provides a thin layer to isolate the mobility policy 315 from any specific access networks, thus making the design modular and easily extended to different RATs.

Figure 5:
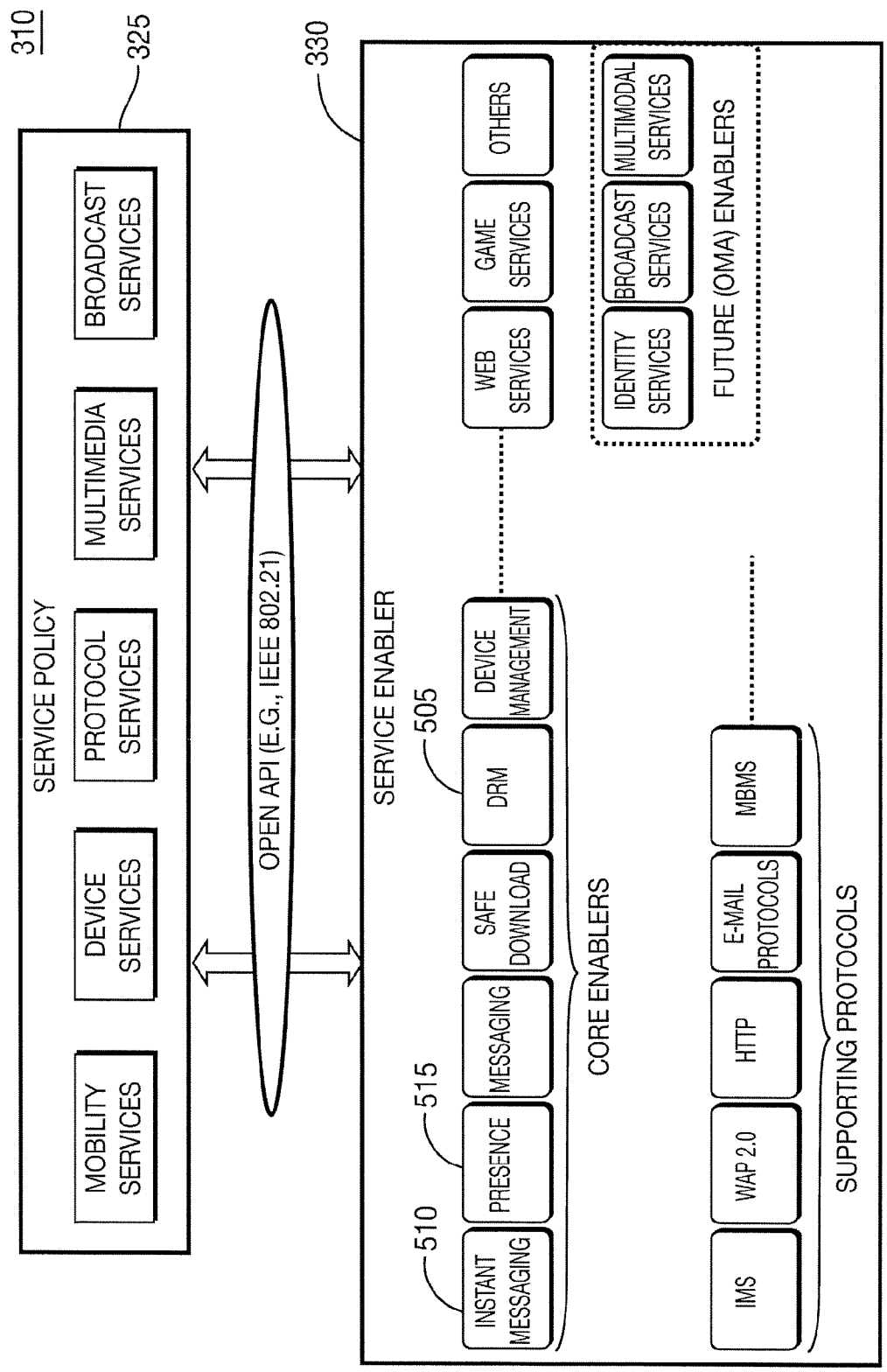

FIG. 5 shows an example of the service entity 310. The service enabler 330 is a set of software functions and standardized APIs that enable third party application developers to define and build mobile device applications independently of the underlying transport technologies. Typical examples of these enabling technologies are DRM 505, instant messaging 510 and presence 515. Using these examples alone in a typical implementation, an end user application developer could develop an application that allows DRM protected content to be sent via an Instant Messaging facility only when some Presence condition is in place. The service enabler 330 allows an end user application to make action calls and interrogations on the enabling functionality in a standardized manner to allow the development of, in theory, an infinite number of applications that operate in a manner that is transparent to the supporting transport technologies.

The service policy 325 is an intelligent entity which handles service related issues and provides the policy for coordination of different applications supported by the service enabler 330.

Figure 6:
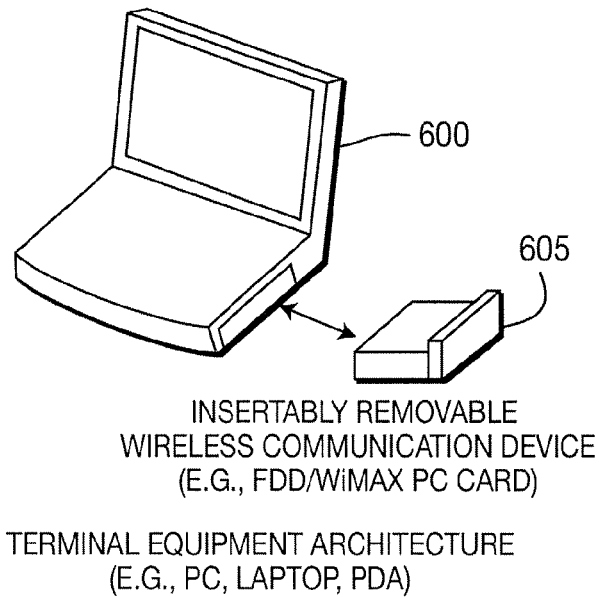
FIG. 6 shows terminal equipment architecture having an insertably removable wireless communication device in accordance with another embodiment of the present invention.

In accordance with another embodiment shown in FIG. 6, the present invention is directed to a terminal equipment architecture 600 including an insertably removable wireless communication device 605 which provides functions similar to those of the MT module 105 and the WLAN chip 130 shown in FIG. 1. The insertably removable wireless communication device 605 may take the form of an FDD/WiMAX PC card. The FDD/WiMAX PC card enables the terminal equipment architecture 600 to connect to a wireless network in order to use various applications, such as web browsing, email, file transfer or the like.

The above mentioned insertably removable wireless communication device 605 may support multiple radio access technologies (RATs). The mobility middleware will allow seamless service continuity for users who are running applications from their portable computing devices such as PCs, notebooks, personal data assistants (PDAs), and the like.

Figure 7:
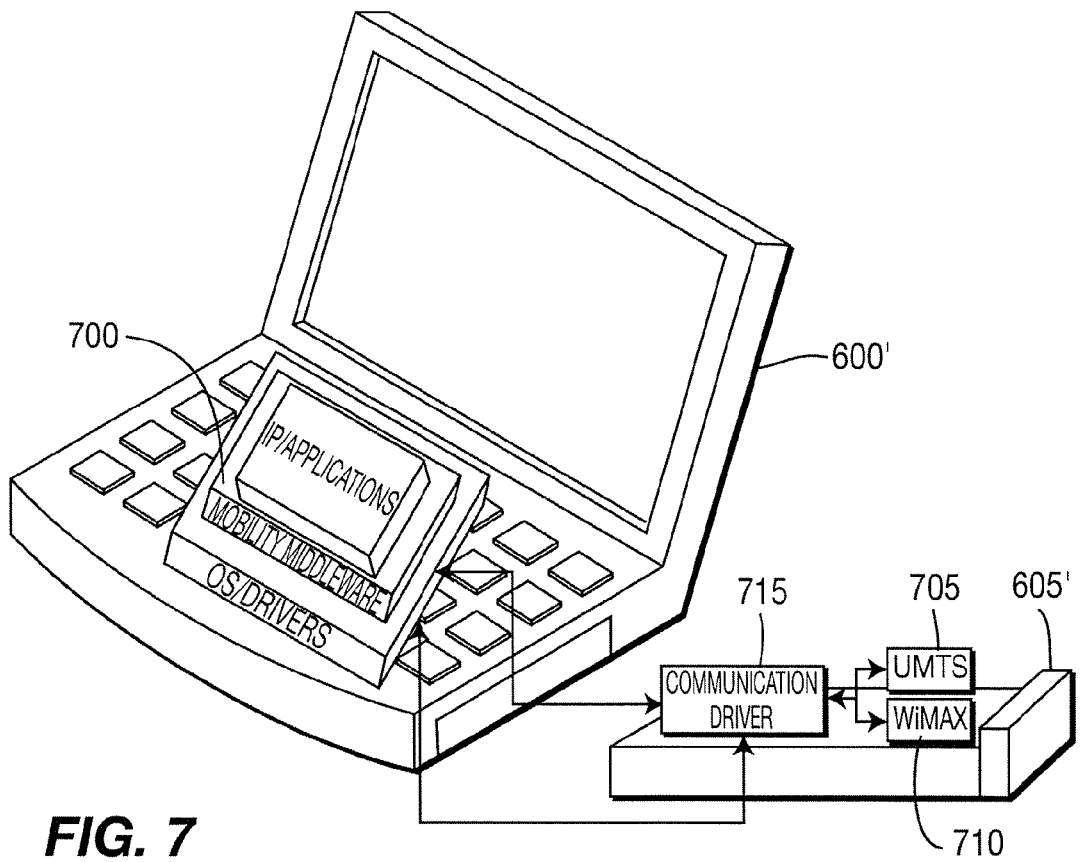
FIG. 7 shows an insertably removable wireless communication device in accordance with the present invention.

In one embodiment of the present invention shown in FIG. 7, mobility middleware 700 resides only in terminal equipment 600'. FIG. 7 shows an insertably removable wireless communication device 605' having a dual mode FDD/WiMAX PC Card architecture in accordance with the present invention. Although FIG. 7 only shows a UMTS module 705, a WiMAX module 710 and a communication module 715 as being part of the insertably removable wireless communication device 605' as an example of realization, a converged insertably removable wireless communication device may support multiple different access technologies, (e.g., IEEE 802.15, digital video broadcasting—handheld (DVB-H), and the like).

The insertably removable wireless communication device 605' provides a multiple radio transport medium to the applications in the terminal equipment 600'. In FIG. 7, only a UMTS 705 and a WiMAX 710 are shown as an example. The UMTS 705 and the WiMAX 710 consist of the protocol software and a modem. These components can be any standard compliant implementation. The applications in the terminal equipment 600' are ignorant of the underlying various transport mechanisms. The applications normally send and receive data without any changes. The details about the transport are hidden by the mobility middleware 700. The mobility middleware 700 provides a uniform and consistent interface to the applications in the terminal equipment 600'. The mobility middleware 700 determines which radio is to be made active and used for data transfer. The mobility middleware 700 is completely implemented in the terminal equipment 600', which enables it to support more features, functionalities and policies due to availability of greater computing capability, memory and power. The mobility middleware 700 communicates with the protocol software components, (e.g., UMTS 705 and WiMAX 710), residing on the insertably removable wireless communication device 605' over a USB link. The commands and response between the mobility middleware 700 and the protocol software are carried over the USB link. The communication driver 715 receives the USB traffic and then routes the mobility middleware commands and responses to and from the protocol software components.

Figure 8:
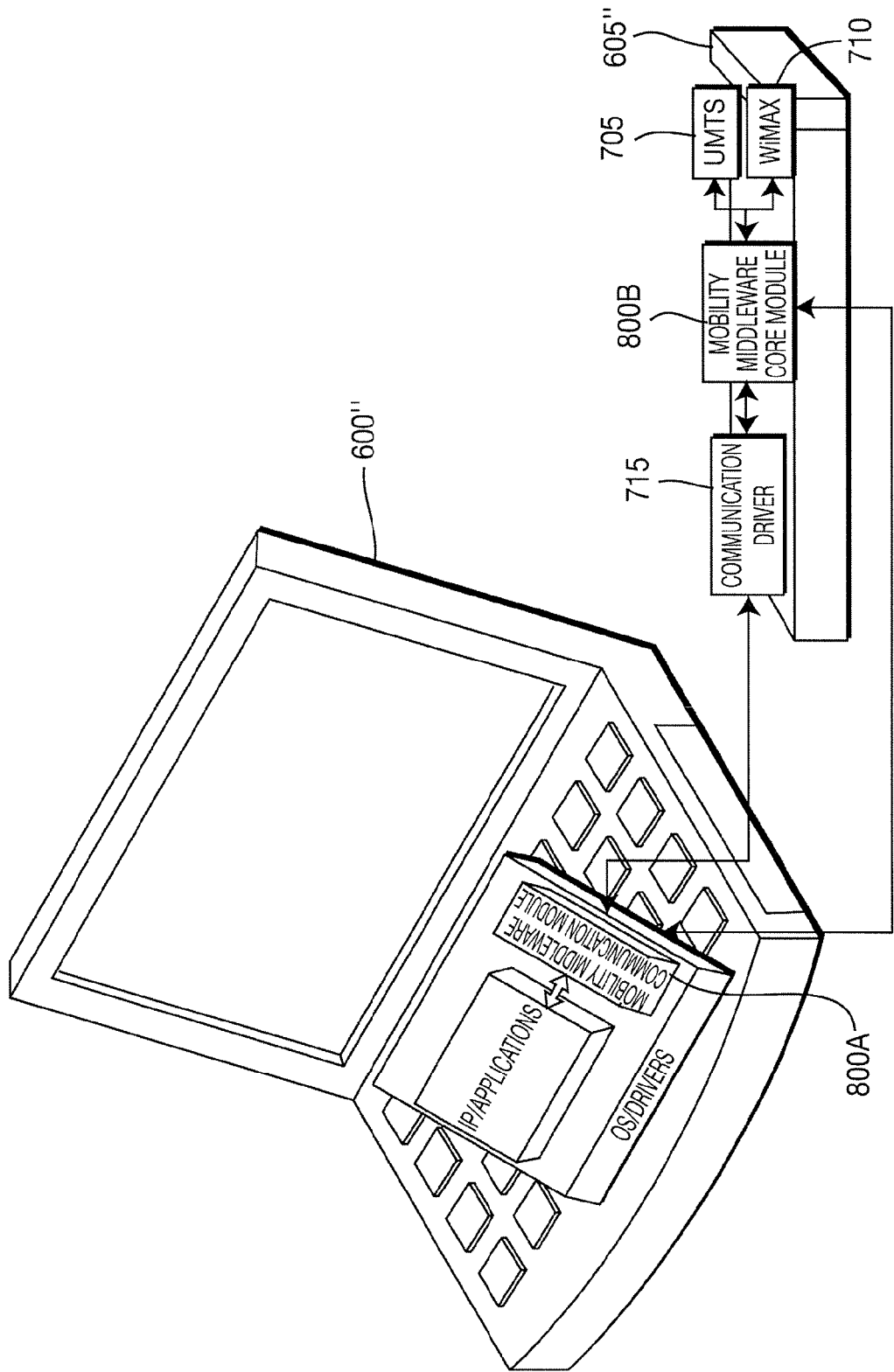
FIG. 8 shows an insertably removable wireless communication device in accordance with an alternative embodiment of the present invention.

FIG. 8 shows an alternative dual mode FDD/WiMAX PC Card architecture in accordance with the present invention. In FIG. 8, a mobility middleware communication module 800A resides on terminal equipment 600', and a mobility middleware core module 800B resides on an insertably removable wireless communication device 605'' between the communication driver 715 and the UMTS 705 and the WiMAX 710.

The mobility middleware core module 800B provides a uniform and consistent interface to the applications in the terminal equipment 600''. The mobility middleware core module 800B determines which radio is to be made active and used for data transfer. The mobility middleware communication module 800A supports sending and receiving of higher layer messages such as IP messages. The mobility middleware core module 800B is implemented in the insertably removable wireless communication device 605'' which enables the terminal equipment 600'' to access and react to link level events faster, thus improving handover efficiency. The mobility middleware core module 800B communicates with the protocol software components, (e.g., UMTS 405 and WiMAX 410), residing on the insertably removable wireless communication device 605'' through API calls or by invoking AT commands. The commands and response between the mobility middleware communication device 800A and the protocol software are carried over the USB link. The communication driver 715 receives the USB traffic and then routes the mobility middleware commands and responses to and from the protocol software components via the mobility middleware core module 800B.

Figure 9:
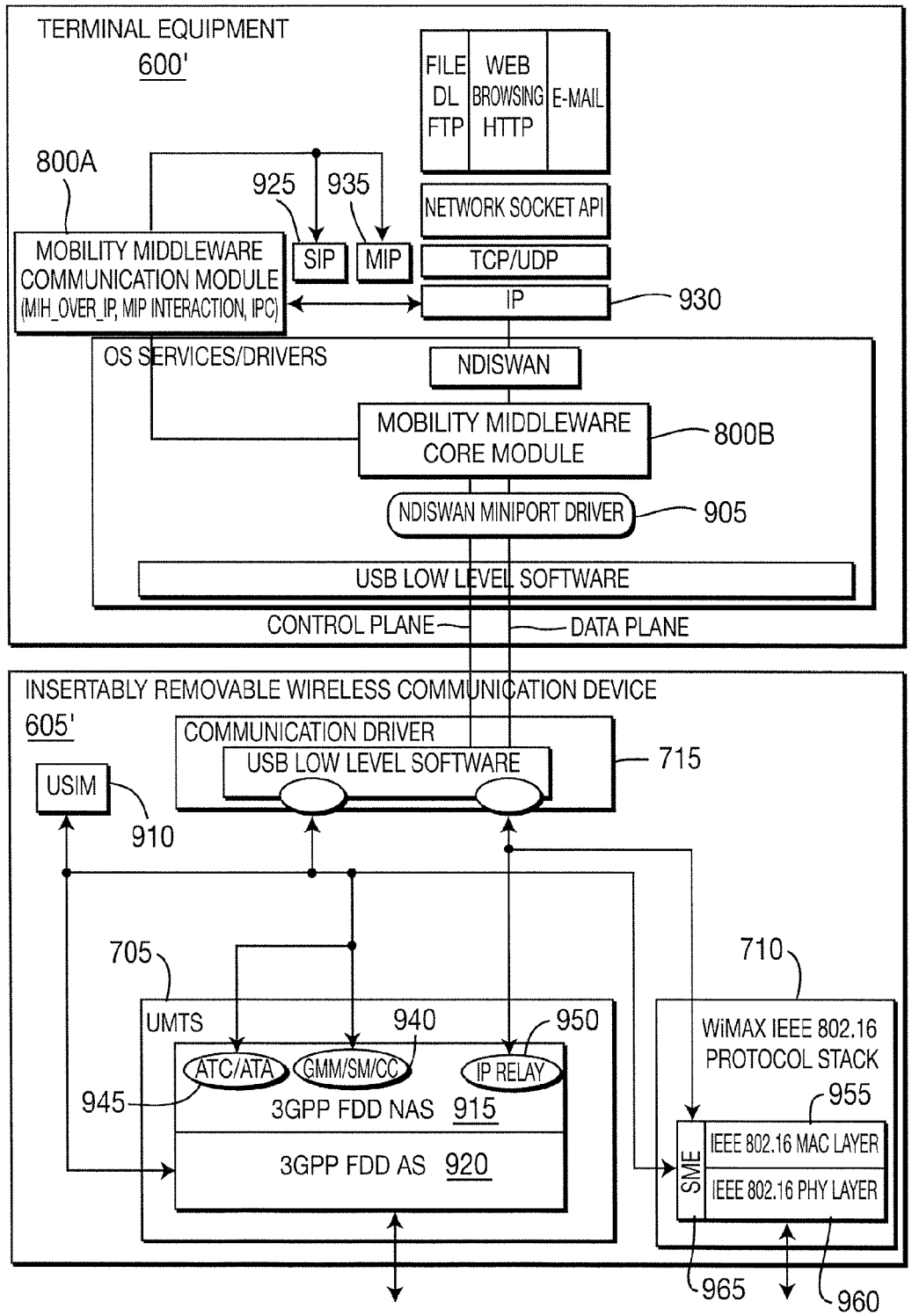
FIG. 9 is a functional block diagram depicting a mobility middleware in an insertably removable wireless communication device, in accordance with the architecture of FIG. 7.

FIG. 9 is a functional block diagram depicting mobility middleware in the terminal equipment 600' in accordance with the architecture of FIG. 7. In this scenario, it is assumed that the operating system (OS) on the terminal equipment 600' is a MicroSoft (MS) Windows OS, and the interface between the terminal equipment 600' and the insertably removable wireless communication device 605' is a USB.

As shown in FIG. 9, the mobility middleware is implemented in the terminal equipment 600' as two modules: a mobility middleware communication module 800A and a mobility middleware core module 800B, which is an extension to a network driver interface specification (NDIS) wide area network (NDISWAN) miniport driver 905. The end user applications in the terminal equipment 600' may include voice over IP (VoIP), video, and the like. The terminal equipment 600' further includes a session initiation protocol (SIP) client 920, an Internet protocol (IP) suite 930 and a mobile IP (MIP) client 935. As previously described with reference to FIG. 4, the mobility middleware 800A and 800B communicate via an API, such as an IEEE 802.21 API.

The insertably removable wireless communication device 605' includes a USIM 910, a UMTS 705, a WiMAX 710 and a communication driver 715. The UMTS 705 includes a 3GPP FDD NAS 915 and a 3GPP FSS AS 920. The WiMAX 710 includes an IEEE 802.16 protocol stack. As defined in 3GPP standards, the USIM 910 includes an authentication and key agreement (AKA) cellular security module and an extensible authentication protocol (EAP) AKA WLAN security module. The security modules exchange relevant security information with the mobility middleware core module 800B over a USB link. The NAS 915 includes a GSM CC/SM 940, an ATC advanced technology attachment (ATA) 945 and an IP relay.

Both of the NAS 915 and the AS 920 have a standard set of APIs. The mobility middleware 800 communicates by calling the standard APIs. Besides standard API, the mobility middleware 800 uses AT commands to communicate with the NAS 915. The API call or AT commands are carried by a communication link, (e.g., USB link), between terminal equipment 600' and the insertably removable wireless communication device 605'.

The WiMAX IEEE 802.16 protocol stack 710 includes an IEEE 802.11 MAC layer 955, an IEEE 802.11 PHY layer 960 and a session management entity (SME) 965, all of which interface with the mobility middleware 800B via standard API calls over a USB link.

The Mobility Middleware 800 may set a specific RAT as a default when the terminal equipment 600' is initialized. Then, signal strength is continuously monitored by sending standard API commands. As the mobility middleware 800 receives the measurement report, it may optionally send the reports to the network or analyze it locally. Depending on the signal strength and handover algorithm defined, the mobility middleware 800 may prepare the other RAT for a potential handover. When the handover is imminent, the other RAT is started and the session is transferred to the new link. The mobility middleware 800 is responsible for initiation of all the signaling required to maintain the session. The mobility middleware 800 may use API calls, AT commands or any other defined interface to initiate the procedure. In this configuration, the mobility middleware core module 800B resides in the terminal equipment 600'. The mobility middleware core module 800B will have access to enhanced computing capability, memory, more power and the like. Thus, the mobility middleware core module 800B can implement complex handover policy, analysis of measurement reports locally on the client side, thus enabling complex functions to be implemented and decisions to be made locally to improve the performance.

Figure 10:
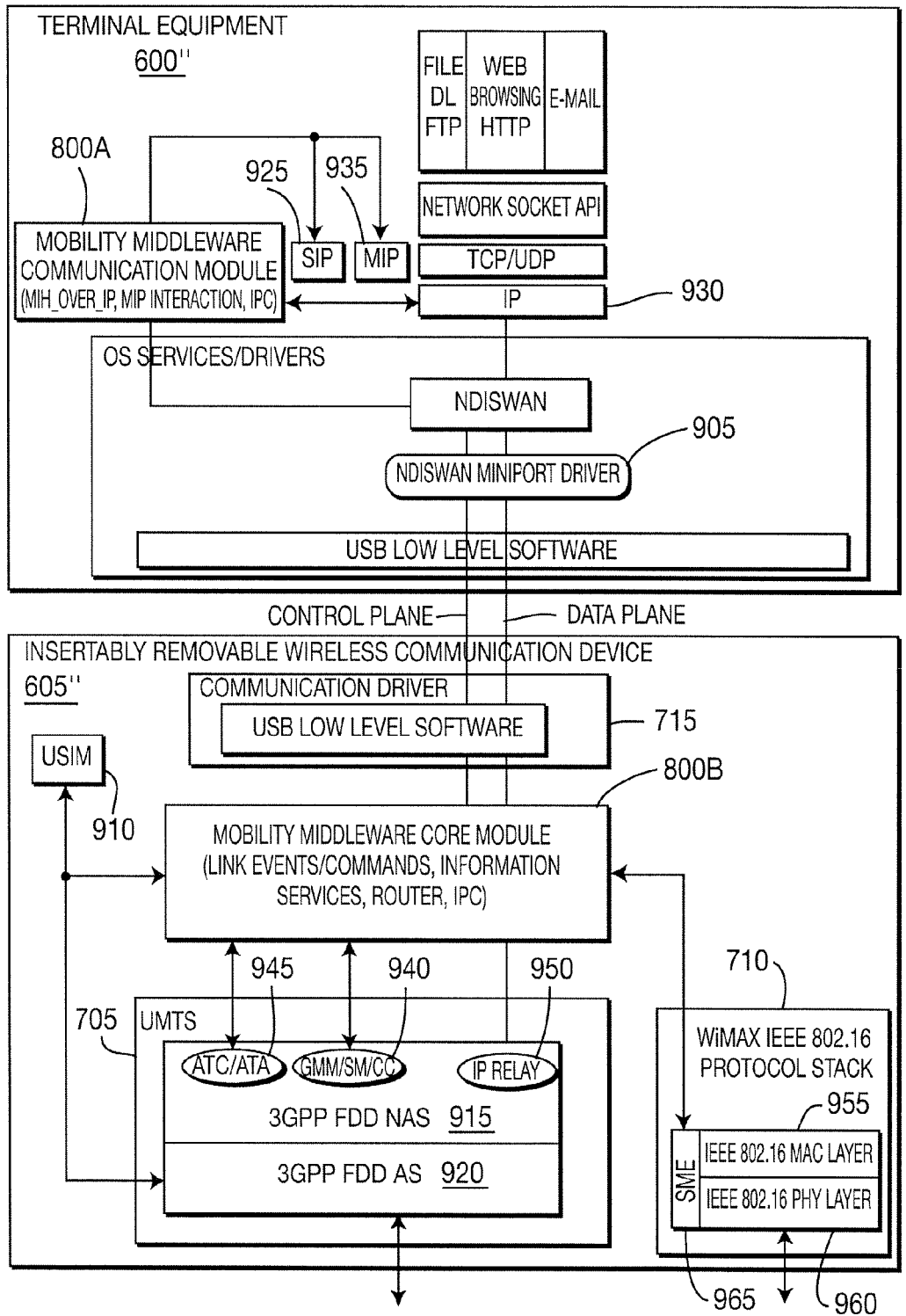
FIG. 10 is a functional block diagram depicting a mobility middleware in an insertably removable wireless communication device, in accordance with the architecture of FIG. 8.

FIG. 10 is a functional block diagram depicting mobility middleware in an insertably removable wireless communication device 600'', in accordance with the architecture of FIG. 8. As shown in FIG. 10, the mobility middleware core module 800B is implemented in the insertably removable wireless communication device 605'', and the mobility middleware communication module 800A resides in the terminal equipment 600''. This option has the advantage of being close to link level protocol stack. Hence, it may more rapidly respond to link level events.

The mobility middleware core module 800B accepts network related commands and data from the terminal equipment 600''. Thus, the terminal equipment 600'' does not see any changes and uses a normal WAN interface to setup/teardown a link and send/receive data. The terminal equipment 600'' and the insertably removable wireless communication device 605'' are connected via a USB link. This USB link is managed by drivers in each of the terminal equipment 600'' and the insertably removable wireless communication device 605''. The WAN commands from terminal equipment 600'' are carried over the USB link to the insertably removable wireless communication device 605'' and intercepted by the mobility middleware core module 800B. The mobility middleware core module 800B then determines how to distribute the commands and data. Besides that, the mobility middleware core module 800B performs management functions, such as monitoring of link status, selecting a link and preparing it for future handoff and, in case of actual handoff, the mobility middleware core module 800B executes the handoff.

To continue a data session, other high level protocols like MIP and SIP procedures need to be initiated by the mobility middleware communication module 800A in the terminal equipment 600''. Upon receiving commands from the mobility middleware core module 500B, the mobility middleware communication module 800A initiates such procedure. The mobility middleware communication module 800A interacts with high level protocols residing in the terminal equipment 600" for providing efficient communication.

In the configuration of FIG. 10, the mobility middleware core module resides on the MT side. It will have very fast access to link level activity. So it can react to such events and trigger actions quickly. Since the core module is implemented in the MT platform and interfaces with the TE using standard USB/WAN interface, the impact on PC side is less. It will be more portable and should be possible to connect and configure easily.

The mobility middleware core 800B performs the important tasks of network detection, network selection, or the like, whereas the mobility middleware communication module 800A performs those functionalities that require message exchanges over IP and invoking an application program interface (API) on other control stacks. The mobility middleware core module 800B and the mobility middleware communication module 800A module exchange messages over a separate interface.

The mobility middleware core module 800B serves as the primary mobility middleware function, whereby multiple services are supported by implementing the control function and IEEE 802.21 link event and services. One service that may be provided by the mobility middleware core module 800B includes network detection which allows a terminal to identify characteristics of surrounding networks.

Another service provided by the mobility middleware core module 800B is network selection. Within many access networks, this service selects the network which is most suitable for a subscriber's demand, based on characteristics such as QoS, system operator, user profile, application requirements and the like.

Yet another service provided by the mobility middleware core module 800B includes inter-network handover. This function performs seamless handover from the previous network to the new selected network. The purpose is to provide service continuity to the user. The function interacts with others mobility functions, such as Mobile IP.

Yet another service provided by the mobility middleware core module 800B includes multi-access QoS. This service insures that the QoS requirements for an application is addressed by the selected network.

Yet another service provided by the mobility middleware core module 800B includes a parallel attach service which initiates the simultaneous connection of multiple AT networks in order to satisfy QoS applications. For example, a voice call can be processed through a cellular network, while a file transfer occurs through a WLAN. The parallel attach service interacts with the handover management and an IP layer for context transfer.

Yet another service provided by the mobility middleware core module 800B includes power management. This service coordinates the power control capabilities of each access technology to improve the battery life of the device.

Yet another service provided by the mobility middleware core module 800B includes a measurement service. This service collects measurements received from the various AT and provides input the others mobility middleware functions, e.g., network selection, power management and the like.

Yet another service provided by the mobility middleware core module 800B includes security. This service processes the security operations necessary to provide a relevant security over AT and improve the Inter-Network handover. For example, it can pre-authenticate users to reduce handover delay.

Yet another service provided by the mobility middleware core module 800B includes routing functionality. The mobility middleware core module 800B routes control messages and data among control applications in the terminal equipment 600 and the communication protocol stacks in the WiMAX 710 of the insertably removable wireless communication device 605.

The mobility middleware communication module 800A may provide MIH messaging. This function will accept MIH messages to be sent over IP to an MIH server from the mobility middleware core module 800B. The mobility middleware communication module 800A will then call proper API to send it over an IP stack available in the computing platform of the terminal equipment 600. On the other hand, the mobility middleware communication module 800A should be able to receive MIH messages from an MIH server over IP and send the messages to the mobility middleware core module 800B.

The mobility middleware communication module 800A supports the mobility middleware core module 800B to interact with other control protocols. This function should provide services to the mobility middleware core module 800B, such as invoking APIs on MIP, SIP at the request of the mobility middleware core module 800B, and the like. The mobility middleware communication module 800A may implement the logic to support an API call and complete the transaction.

The mobility middleware interacts with an IEEE 802.16 management entity to facilitate handover procedures. When a handover from FDD to IEEE 802.16 is imminent, the mobility middleware can request the 802.16 management entity to start the association procedures to establish 802.16 links.

A direct mapping between the IEEE 802.21 primitives, (information, events, commands), and some NAS, (SM and GMM), primitives already exist. There is no change required on SM and GMM for the mobility middleware to work with FDD NAS.

Similar to the FDD NAS, the above mapping is provided between the IEEE 802.21 primitives and the FDD RRC primitives. There is no change required on RRC for the mobility middleware to work with FDD AS.

The interaction of the mobility middleware with Mobile IP is in two aspects. One aspect is that IEEE 802.21 can trigger a Mobile IP to speed up handovers. For example, when an 802.21 "MIH link down" event occurs, the mobility middleware can forward the event trigger to the mobile IP client in the mobile terminal, thus triggering the mobile terminal to register with the foreign agent, obtain care of address and send a "binding update". This may reduce delay in the mobile IP handover procedures.

Another aspect is that there is on going IETF mobile IP standardization activity to support transport of IEEE 802.21 messages, (information, events, commands), between the terminal and network over IP. This method utilizes mobile IP as a "vehicle" to convey IEEE 802.21 messages between the mobile terminal and the network side, thus minimizing the requirement of changes to existing functions on both sides.

The mobility middleware interacts with applications and service enabling protocols, such as SIP. For example, an application may have certain QoS requirements. Mobility shimware will be able to map the QoS requirement to the most suitable network. The mobility shimware interacts with existing security functions in the mobile terminal to address security issues during handover. No changes in current security functions are expected.

Existing AT commands maybe used to convey commands to/from mobility middleware.

The mobility middleware communication module 800A interacts with IP protocol stack to send and receive MIH messages over IP. A "message exchange" interface is established between the mobility middleware core module 800B and the mobility middleware communication module 800A. The mobility middleware core module 800B sends a request to the mobility middleware communication module 800A to send MIH messages over IP to an MIH server. The mobility middleware communication module 800A sends the IP messages and waits for a response. After the mobility middleware communication module 800A receives a response back from the MIH server, the response is forwarded to the mobility middleware core module 800B.

The mobility middleware communication module 800A interacts with MIP and SIP stacks. The mobility middleware core module 800B may send a request on the "message exchange" interface to the mobility middleware communication module 800A to initiate MIP or SIP interaction, or the mobility middleware communication module 800A may independently initiate MIP or SIP interaction.

The present invention may be implemented in any type of wireless communication system, as desired. By way of example, the present invention may be implemented in any type of IEEE 802 type system, WiMAX, LTE or any other type of wireless communication system. The present invention may also be implemented as a multi-layer application in software, or on an integrated circuit, such as an application specific integrated circuit (ASIC), multiple integrated circuits, logical programmable gate array (LPGA), multiple LPGAs, discrete components, or a combination of integrated circuit(s), LPGA(s), and discrete component(s). The present invention applies to future system architecture, middleware, and applications.

The present invention may be implemented in a WTRU and is applicable to wideband code division multiple access (WCDMA), time division duplex (TDD), (high chip rate, low chip rate), time division synchronous—code division multiple access (TDS-CDMA), and FDD air interfaces. The present invention is also applicable to long term evolution (LTE), which is the next generation of UMTS technology.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment, terminal, base station, radio network controller, or any host computer.

The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
a terminal equipment (TE) module including mobility middleware processing circuitry; an applications and protocols processor (APP) and a terminal interface (TI);
the mobility middleware processing circuitr configured to provide the WTRU with access to a plurality of radio access technology (RAT) networks as the WTRU moves between one network and another;
a user services identity module (USIM);
a mobile termination (MT) module;
a protocol stack;
the mobility middleware processing circuitry configured to communicate with the USIM, the APP, the protocol stack and the MT module via a plurality of open application programming interfaces (APIs), and
the mobility middleware processing circuitry configured to perform a security function to provide user pre-authentication to a particular RAT network based on information received from the USIM including:
authentication and key agreement (AKA) information; and
extensible authentication protocol (EAP) information.

2. The WTRU of claim 1 wherein the protocol stack is an IEEE 802.11 protocol stack comprising:
a logical link control (LLC) layer;
an IEEE 802.11 medium access control (MAC) layer;
an IEEE 802.11 physical (PHY) layer;
a session management entity (SME); and
at least one IEEE 802.21 interface through which the mobility middleware establishes at least one link to interface with the protocol stack.

3. The WTRU of claim 1 wherein the MT module comprises:
a third generation partnership project (3GPP) frequency division duplex (FDD) non-access stratum (NAS) including at least one IEEE 802.21 interface; and
a 3GPP FDD access stratum (AS) including at least one IEEE 802.21 open API, wherein the mobility middleware interfaces with the 3GPP FDD NAS and the 3GPP FDD AS via a plurality of links.

4. The WTRU of claim 3 wherein the 3GPP FDD NAS further comprises:
a 3GPP functions mobile network (MN);
a call control (CC) unit;
a session manager (SM);
a general packet radio service (GPRS) mobility manager (GMM);
a radio access bearer manager (RABM);
an attention command set interpreter (ATC);
an ATC advanced technology attachment (ATA);
an Internet protocol (IP) relay; and
a bit stream relay.

5. The WTRU of claim 3 wherein ATC commands are exchanged between the TE module and the MT module via the TI and the ATC ATA.

6. The WTRU of claim 3 wherein the 3GPP FDD AS comprises:
an FDD physical layer (PHY);
an FDD medium access control layer (MAC);
an FDD radio link control (RLC);
a packet data compression protocol (PDCP) unit;
a broadcast and multicast control (BMC) unit; and
a radio resource control (RRC) unit.

7. The WTRU of claim 1 wherein the mobility middleware processing circuitry comprises a mobility entity and a service entity.

8. The WTRU of claim 7, wherein the mobility entity includes at least one mobility policy and at least one mobility enabler.

9. The WTRU of claim 8 wherein the mobility policy performs a network detection function.

10. The WTRU of claim 8 wherein the mobility policy performs a network selection function.

11. The WTRU of claim 8 wherein the mobility policy performs an inter-access handover function.

12. The WTRU of claim 8 wherein the mobility policy performs a parallel attach function.

13. The WTRU of claim 8 wherein the mobility policy performs a measurement function.

14. The WTRU of claim 8 wherein the mobility policy performs a quality of service (QoS) function.

15. The WTRU of claim 8 wherein the mobility policy performs a security function.

16. The WTRU of claim 8 wherein the mobility policy performs a power control function.

17. The WTRU of claim 8 wherein the mobility enabler interfaces with different radio access technologies (RATs) via an open API to collect, consolidate and normalize statistics or other information received from RAT networks, transmit commands to the RAT networks and provide a control/information trigger interface to the mobility policy for controlling the RAT networks.

18. The WTRU of claim 7, wherein the service entity includes at least one service policy and at least one service enabler.

19. The WTRU of claim 1 wherein the mobility middleware processing circuitry interfaces with third party applications and transport stacks via at least one open API.

20. The WTRU of claim 1, wherein the mobility middleware is further configured to communicate AT commands.

21. The WTRU of claim 1 wherein the mobility middleware processing circuitry includes a mobility middleware communication module and a mobility middleware core module; further comprising:
a first driver configured to communicate with the mobility middleware core module via an open API;
an insertably removable wireless communication device having an inserted configuration in communication with the first driver to provide a multiple radio transport medium to applications running in the TE module;
the mobility middleware communication module configured to communicate with the mobility middleware core module through an open API;
the mobility middleware core module and the mobility middleware communication module configured to provide the terminal equipment with access to the RAT networks as the WTRU moves between one network and another; and
the mobility middleware core module configured to provide the user pre-authentication to a particular RAT network by receiving and processing the AKA and EAP information from the USIM.

22. The WTRU of claim 21 wherein the first driver is a network driver interface specification (NDIS) wide area network (NDISWAN) miniport driver.

23. The WTRU of claim 21 wherein the insertably removable wireless communication device in the inserted configuration further comprises:
a second driver in communication with the first driver via an open API;
a universal mobile telecommunications system (UMTS) electrically coupled to the second driver; and
the protocol stack electrically coupled to the second driver.

24. The WTRU of claim 23 wherein the protocol stack is an IEEE 802.16 protocol stack comprising:
an IEEE 802.16 medium access control (MAC) layer;
an IEEE 802.16 physical (PHY) layer; and
a session management entity (SME).

25. The WTRU terminal equipment of claim 23 wherein the UMTS comprises:
a third generation partnership project (3GPP) frequency division duplex (FDD) non-access stratum (NAS); and
a 3GPP FDD access stratum (AS).

26. The WTRU of claim 21 wherein the insertably removable wireless communication device is a frequency division duplex (FDD) wireless broadband personal computer (PC) card.

27. The WTRU of claim 21, wherein the mobility middleware core module is further configured to communicate AT commands.

28. The WTRU of claim 1 wherein the mobility middleware processing circuitry includes a mobility middleware communication module and a mobility middleware core module; further comprising:
a first driver in communication with the mobility middleware communication module via an open API;
an insertably removable wireless communication device having an inserted configuration in communication with the first driver for providing a multiple radio transport medium to applications running in the TE module including:
the mobility middleware core module;
a second driver in communication with the mobility middleware core module via
an open API;
the mobility middleware core module and the middleware communication module configured to communicate via the first and second drivers;
the mobility middleware core module and the mobility middleware communication module further configured to provide the TE module with access to the RAT networks as the WTRU moves between one network and another; and
the mobility middleware core module configured to provide the user pre-authentication to a particular RAT network based on the AKA and EAP information from the USIM.

29. The WTRU of claim 28 wherein the first driver is a network driver interface specification (NDIS) wide area network (NDISWAN) miniport driver.

30. The WTRU of claim 28 wherein the insertably removable wireless communication device in the inserted configuration further comprises:
a universal mobile telecommunications system (UMTS) electrically coupled to the mobility middleware core module; and the protocol stack electrically coupled to the mobility middleware core module.

31. The WTRU of claim 30 wherein the insertably removable wireless communication device further comprises the USIM in communication with the mobility middleware core module and the UMTS in the inserted configuration.

32. The WTRU of claim 30 wherein the UMTS comprises:
a third generation partnership project (3GPP) frequency division duplex (FDD) non-access stratum (NAS); and
a 3GPP FDD access stratum (AS).

33. The WTRU of claim 30 wherein the protocol stack is an IEEE 802.16 protocol stack comprising:

an IEEE 802.16 medium access control (MAC) layer;
an IEEE 802.16 physical (PHY) layer; and
a session management entity (SME).

34. The WTRU of claim 28 wherein the insertably removable wireless communication device is a frequency division duplex (FDD) wireless broadband personal computer (PC) card.

35. The WTRU of claim 28, wherein the mobility middleware core module is further configured to communicate AT commands.

* * * * *